March 22, 1966 P. J. LISTER ET AL 3,241,181
HOSE CURING UNIT
Filed March 2, 1964 6 Sheets-Sheet 1
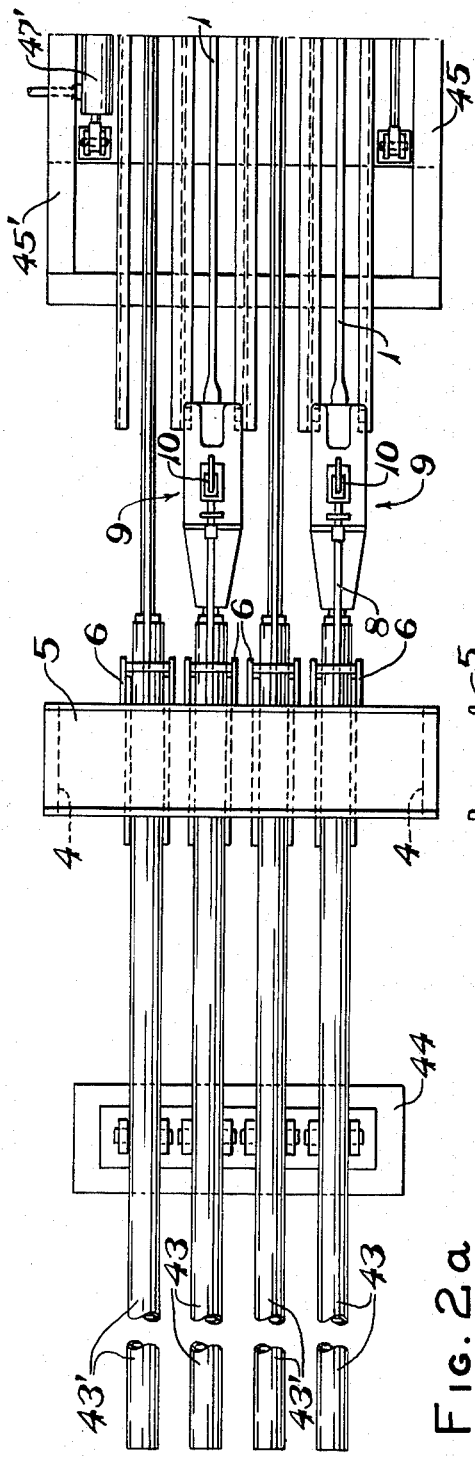
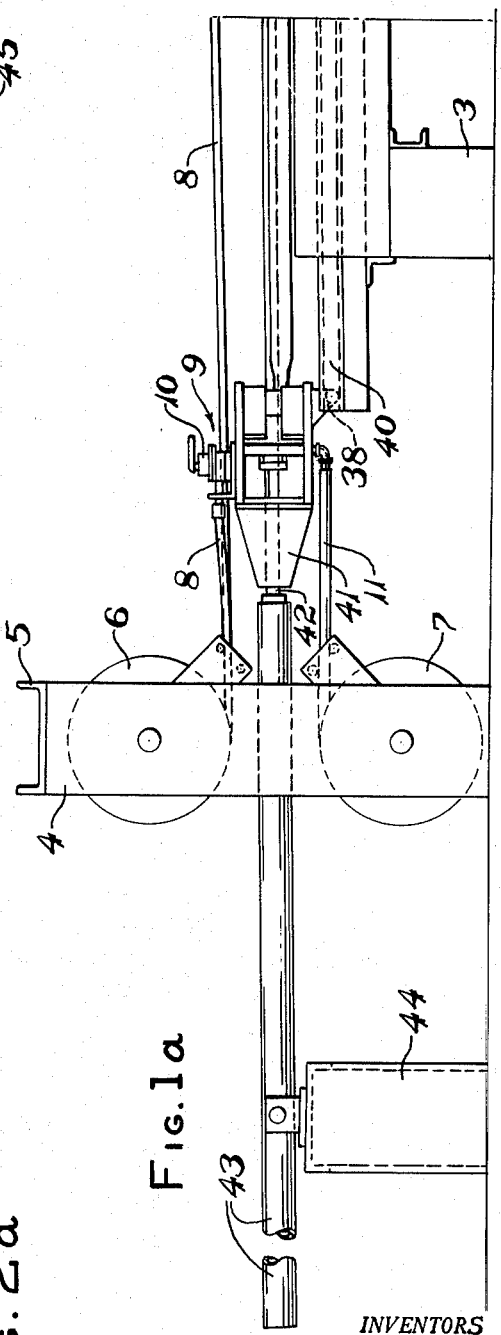
INVENTORS
PAUL J. LISTER
ALEXANDER KRYNYTZKY
BY Joseph Januszkiewicz
ATTY.

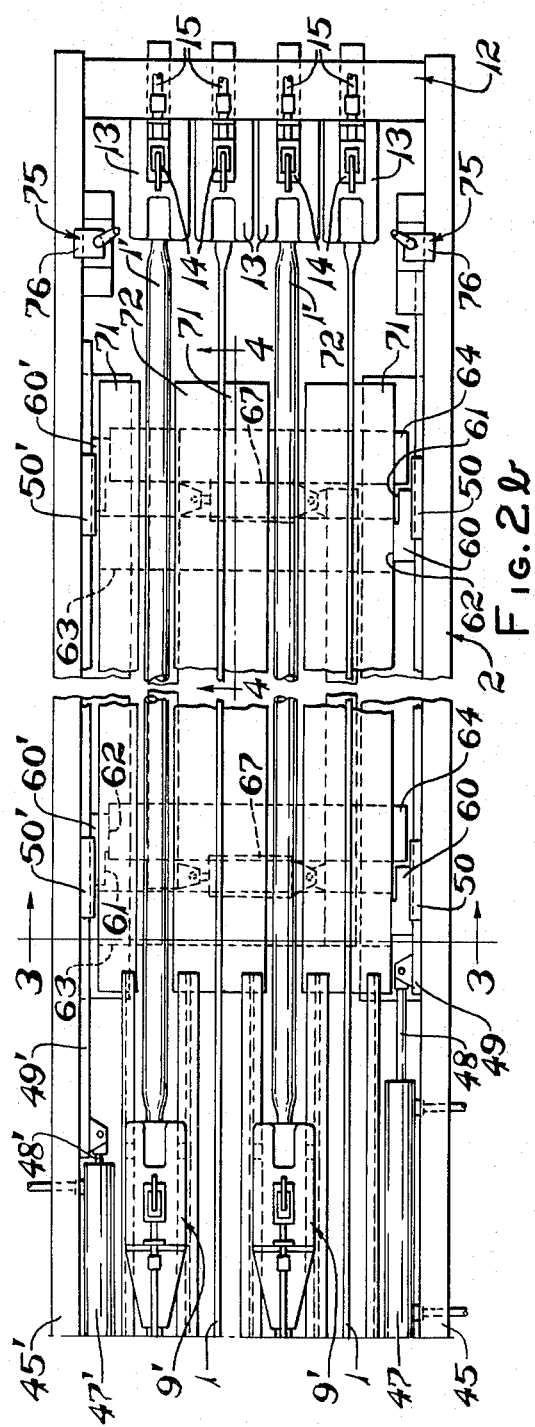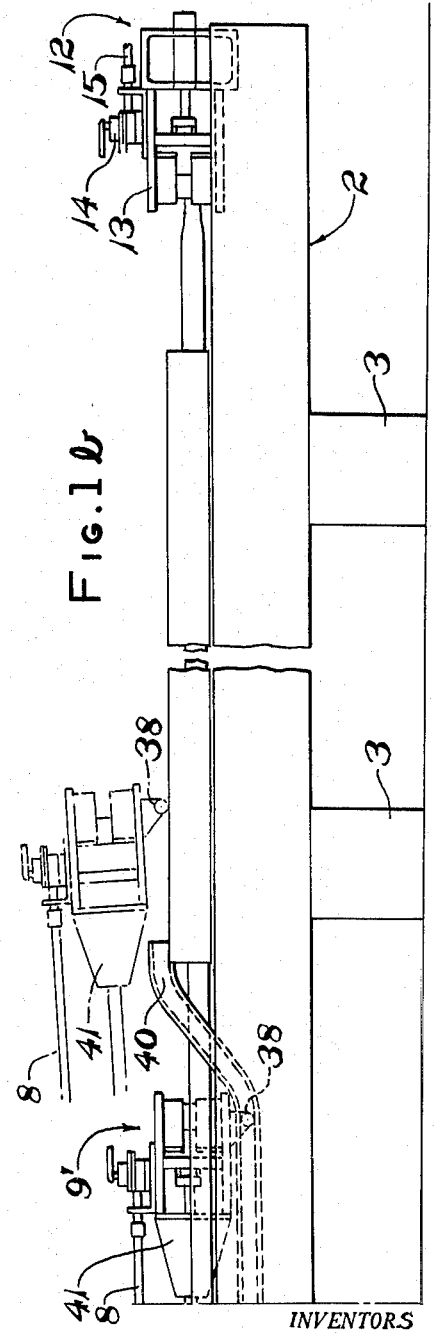

March 22, 1966  P. J. LISTER ET AL  3,241,181
HOSE CURING UNIT

Filed March 2, 1964  6 Sheets-Sheet 4

INVENTORS
PAUL J. LISTER
ALEXANDER KRYNYTZKY
BY
ATTY.

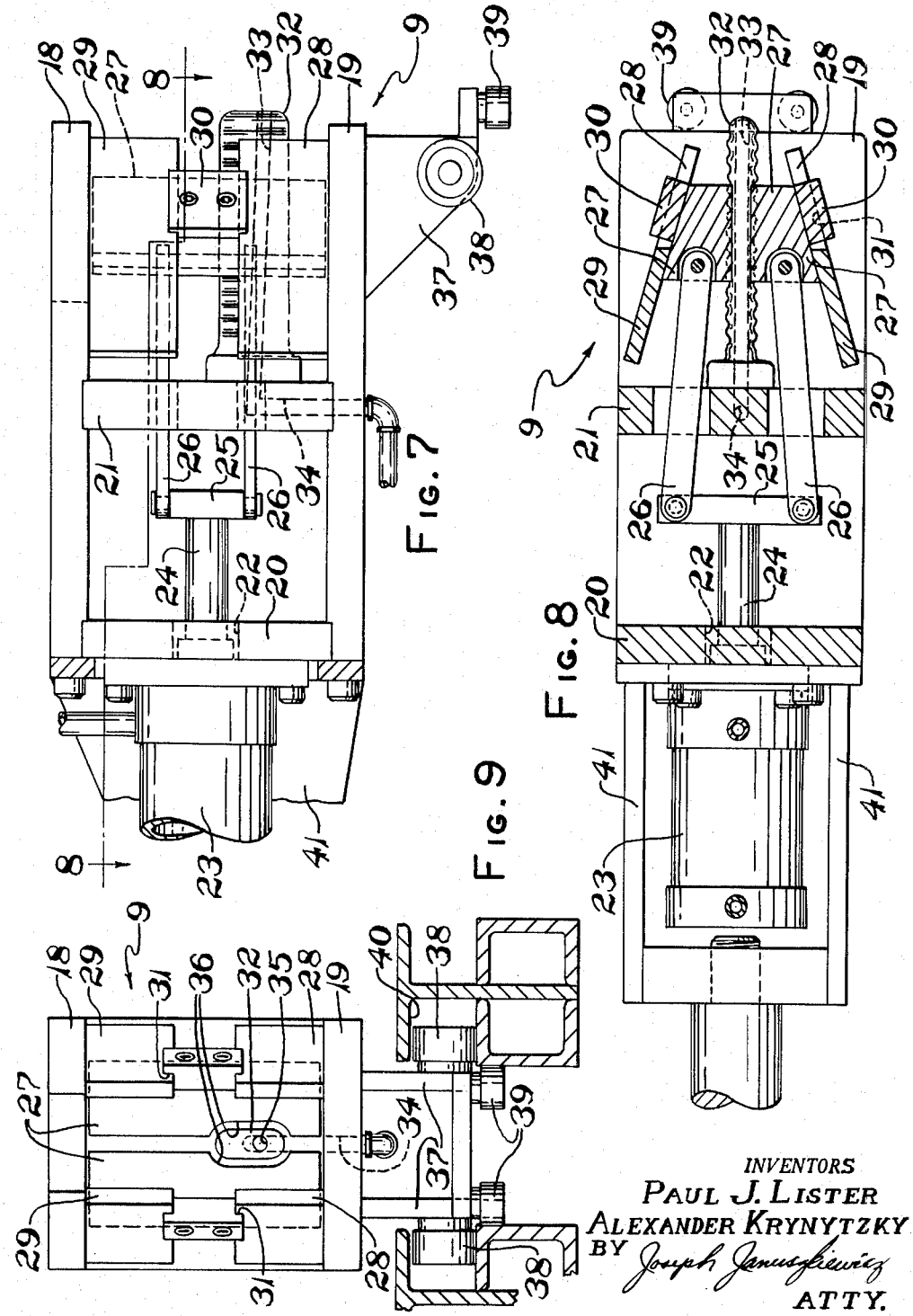

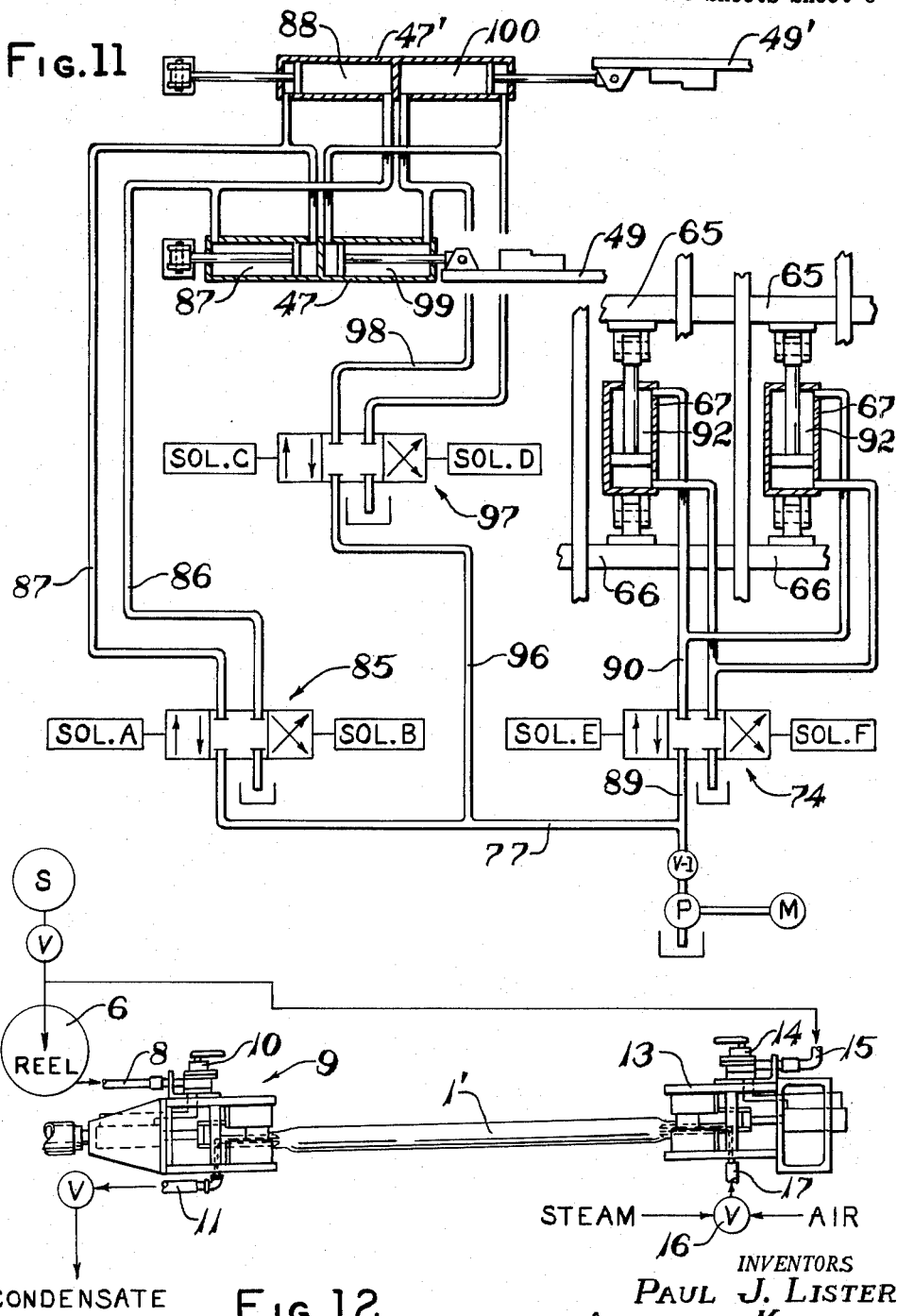

United States Patent Office 3,241,181
Patented Mar. 22, 1966

3,241,181
HOSE CURING UNIT
Paul J. Lister, Akron, Ohio, and Alexander Krynytzky, Buffalo, N.Y., assignors to The B. F. Goodrich Company, New York, N.Y., a corporation of New York
Filed Mar. 2, 1964, Ser. No. 348,629
8 Claims. (Cl. 18—6)

This invention relates to an apparatus for processing tubular yieldable objects.

In the manufacture of tubular products such as fire hose, a rubber tube is encased in one or more plies of fabric. In the case of fire hose, the fabric tubing and the rubber tubing are prepared separately, after which the rubber tubing is inserted into the fabric tubing and thereafter vulcanized or cured as a unit. During the curing operation, a curing fluid such as steam under pressure is admitted to the rubber tubing to expand the rubber tubing and fabric tubing into engagement with a mold which confines the lateral expansion into an oblong shape (as viewed in cross section) while simultaneously permitting longitudinal expansion. One of the problems in such manufacture of hoses is the problem of maintaining a uniform wall thickness.

This invention provides a novel means which clamps the respective end portions of the hose, thereafter subjects the hose to a tensioning folowed by a preliminary curing of the hose in a round cross-sectional form followed by a final curing of the hose in an oblong cross-sectional form to thereby provide a flat cured hose which can be reeled or folded for storage without creating excessive tensions where it bends thereby eliminating failure of hose due to tension. In addition such manufacture provides a hose of consistent uniform wall thickness which prolongs the useful life thereof. Such manufacture eliminated certain failures in hoses which failures were due to restrictions in the hose caused by adherence of certain adjacent inner wall portions of the rubber tubing during the oblong curing. The invention cures the hose initially round in cross section to thereby separate the inner wall surfaces and prevent adherence of adjacent wall portions. In addition, during such curing process a novel means is provided to stretch the hoses during the curing process individually to their maximum length whereby shorter lengths of hose can be utilized. When hose in the uncured state is cut for a desired length, it is understood that such hose will stretch in the longitudinal direction; however, such elongation is achieved as a unit, and the hose with the shortest length of stretch or elongation determines the elongation of the remaining hoses in the gang stretching. In the present invention, however, the hoses are stretched individually to have each hose stretch to its maximum value. Such process additionally eliminates any tendency of the hose to elongate under use.

An object of this invention is to provide a novel apparatus for curing tubular hose in flat cross-sectional form.

Another object of this invention is to provide an apparatus which cures fire hose into an oblong cross-sectional form with consistent wall tickness.

A further object of this invention is to cure simultaneously in an oblong cross-sectional form a plurality of hoses to their individual maximum lengths with uniform wall thickness.

Another object of this invention is to economically simultaneously cure a plurality of hoses in round and oblong cross-sectional form on a single apparatus.

Still another object of this invention is to economically cure a plurality of hoses in different cross-sectional form simultaneously, to minimize space requirement for the curing apparatus.

A further object of this invention is to insure uniform wall thickness by preliminarily curing a rubberized tubular product in the round cross-sectional form and thereafter final curing the tubular product in an oblong cross-sectional form.

With these and other objects in view, as will hereinafter more fully appear, and which will be more particularly pointed out in the appended claims, reference is now made to the following description taken in connection with the accompanying drawings in which:

FIGS. 1a and 1b are simplified side elevational views of the fire hose curing apparatus constructed in accordance with the principles of this invention which when longitudinally aligned show the entire hose curing apparatus.

FIGS. 2a and 2b are plan views of the hose curing apparatus shown in FIGS. 1a and 1b which when longitudinally aligned show the entire hose curing apparatus.

FIG. 7 is a side elevational view of the clamping unit.

FIG. 8 is a plan view partly in cross section of the clamping unit taken on line 8—8 of FIG. 7.

FIG. 9 is a front elevational view of the clamping unit.

FIG. 11 is a schematic diagram of the hydraulic control circuit for moving the platforms on the curing table and the hydraulic control circuit for moving the wedge bars into position.

FIG. 12 is a simplified schematic diagram of the pneumatic control circuit of the chucks and the steam lines for the respective end portions of the hose curing unit showing a hose in the round curing position.

Figure 3:
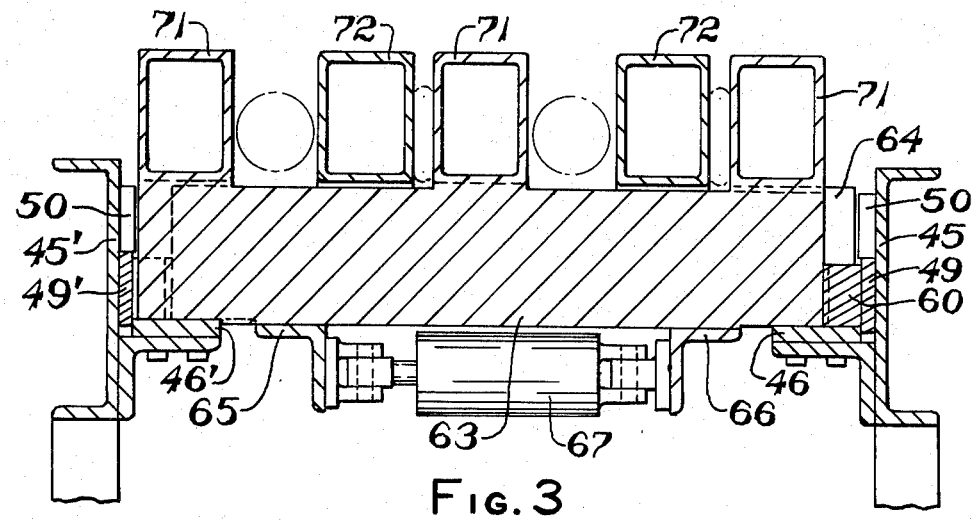
FIG. 3 is a partial cross-sectional view of the curing table taken along line 3—3 of FIG. 2b.

Referring to FIGS. 1 and 2, a plurality of hoses 1 having rubber lining tubes and tubular woven fabric covers are mounted on an elongated work table designated generally as 2. Table 2 is mounted on standard 3. Adjacent to one end of the table 2 is a pair of vertically extending side supports 4 (FIGS. 1a and 2b) having a cross support 5 which supports for rotation upper reels 6 and lower reels 7. Each upper reel 6 supports a length of flexible conduit 8 which conduit 8 has one end connected to a suitable source of air pressure and the other end connected to a chuck 9, which chuck 9 is controlled via a manually operated control valve 10. Each reel 7 supports a length of flexible conduit 11, which conduit 11 has one end connected to an associated chuck 9 (and hose 1) to direct the steam and condensate therefrom via means not shown to a suitable discharge manifold and valve.

The other end of table 2 has a platform structure 12, on which is mounted a plurality of chucks 13, with each chuck 13 being operated via a control valve 14. Each control valve 14 is connected via line 15 to a suitable source of fluid pressure. As shown in FIG. 12, vulcanizing or curing fluid such as steam from a suitable source is connected to each chuck 13 via separate regulating valves 16 and supply lines 17 to thereby supply curing fluid to the head end of the respective hoses 1. The table 2 is preferably inclined to the horizontal for drainage of the hose during and after vulcanization.

Figure 6:
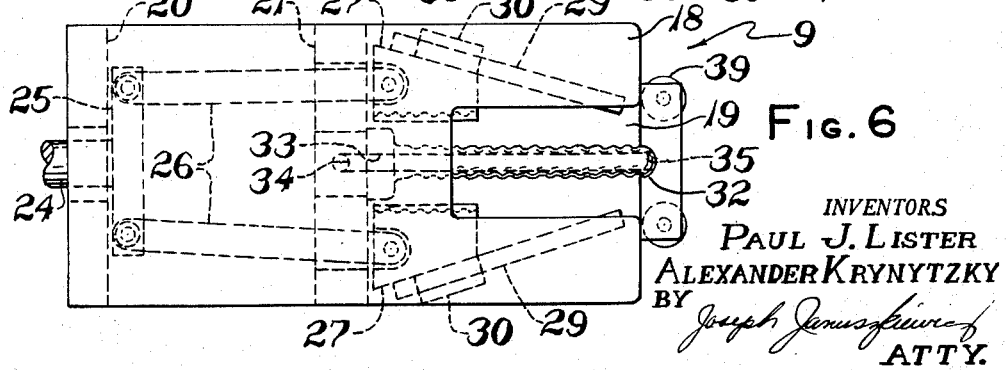
FIG. 6 is a plan view of the clamping unit showing the jaws in open position.

Chucks 13 and 9 are similar in all respects except that since chuck 9 is movably mounted, means are provided to guide the chuck body in its linear movement. Chuck 9 comprises upper and lower plates 18 and 19 (FIG. 7) respectively connected by spaced cross plates 20 and 21. Cross plate 20 has a central bore 22 (FIG. 6). An air cylinder 23 is suitably connected to plate 20, with a rod 24 of air cylinder 23 extending through the central bore 22. The rod 24 has its outer end connected to a bracket 25 which bracket 25 pivotally supports one end of links 26. The other ends of links 26 are pivotally connected in pairs to a pair of movable jaw blocks 27. The links 26 extend through suitable slots in plate 21. Lower plate 19 has a pair of vertically extending spaced guideways 28 which as viewed in FIG. 6 converge toward the front end portion of the chuck 9 for a purpose to be described. Upper plate 18 has a pair of depending spaced guideways 29 in alignment with the converging guideways 28. Each jaw block 27 has a guide member 30 mounted on its outer side wall (FIGS. 6 and 7). Each guide member 30 is recessed as at 31 to define a groove between the outer wall of each jaw block 27 and the adjacent recessed wall surface of the associated guide member 30 to thereby guide the respective jaw blocks 27 to work gripping engagement upon movement of the respective jaw blocks 27 towards the forward portion of the chuck 9. Pressurization of the head end of air cylinder 23 extends the rod 24 rightward as viewed in FIG. 6 to thereby move the respective jaw blocks 27 and their associated guide members 30 rightwardly to the position shown in FIG. 8 via links 26. Cross plate 21 has an elongated serrated projection 32 mounted centrally thereon. Projection 32 is oblong in cross section and has a bore 33 extending longitudinally therethrough which bore 33 has one end communicating with a conduit 34 in chuck 9 via which condensate or steam may flow. The other end of bore 33 communicates with an opening 35 (FIG. 9) which opening 35 is adapted to communicate with the bore of a hose clamped in chuck 9. As seen in FIG. 9, the respective jaw blocks 27 are arcuately recessed as at 36, which recessed portion is serrated to cooperate with the serrated projection 32 to clamp the hose wall therebetween. Lower plate 19 has a pair of spaced depending brackets 37 (FIG. 9) which support rotatable wheels 38, 38 and wheels 39, 39. As seen in FIGS. 1 and 9 the wheels 38 ride in grooves 40 formed in the framework of table 2 while wheels 39 guide the chucks 9 in their longitudinal movement on the table.

Each chuck 9 (FIGS. 5, 6 and 1) is connected via connecting members 41 to a piston rod 42 (FIG. 1a) of a hydraulic cylinder 43. Each hydraulic cylinder 43 is pivotally supported at its rear end portion on a standard 44 as by a trunnion. The hydraulic cylinders and the chucks 9 are alternately designated 43 and 43' and 9 and 9' to facilitate the explanation of the apparatus. The chucks 9 are moved by cylinders 43 and the chucks 9' are moved by the cylinders 43'.

Table 2 comprises a pair of suitably spaced channel members 45 and 45' (FIGS. 1, 2 and 3) held in parallel spaced relationship by means not shown and resting on standards 3. Longitudinally extending guideways 46 and 46' are suitably connected to the respective lower inner side walls of the channel members 45 and 45' respectively.

Figure 5:
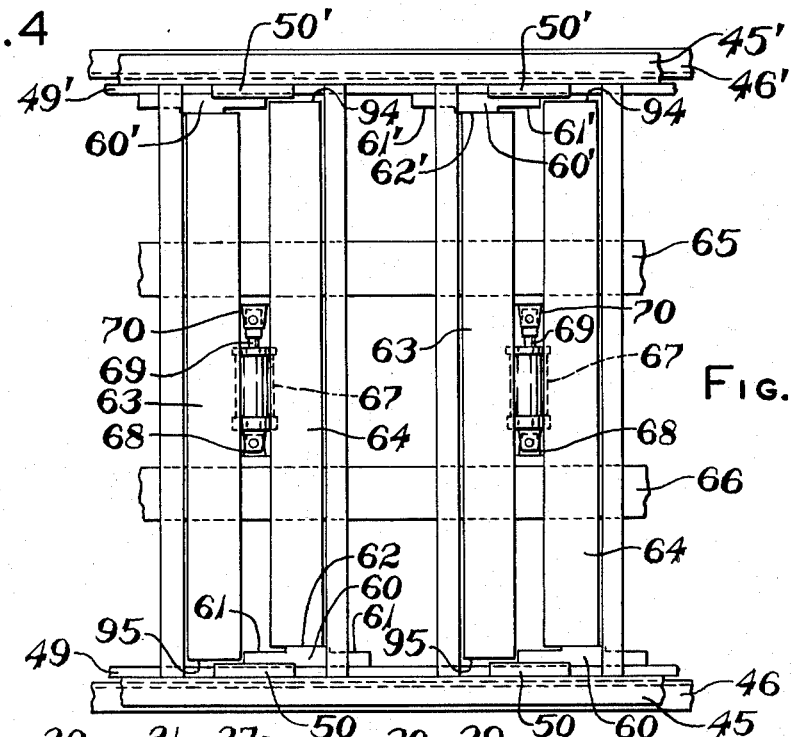
FIG. 5 is a fragmentary plan view of the curing table with portions removed for clarity.

Mounted on the one end of each channel member 45 and 45', on the inner wall surface thereof, are hydraulic cylinders 47 and 47' having their piston rods 48 connected to wedge bars 49 and 49', which wedge bars extend along the top surface of guideways 46, 46' for substantially the full length thereof. To guide the longitudinal reciprocable movement of wedge bars 49 and 49' on guideways 46 and 46', spaced bumper bars 50 and 50' are mounted on the inner wall surface of channel members 45 and 45' such as to have the bottom surface thereof contact the top surface of wedge bars 49 and 49'. A plurality of spaced cam members 60 and 60' are connected to wedge bars 49 and 49', respectively, for reciprocable movement therewith. Each cam member 60 and 60' has stepped profiles 61, 61' and 62, 62', respectively, wherein profiles 61 and 61' are of less width than profiles 62, 62'. Mounted on the guideways 46 and 46' of table 2 for movement in a direction normal to the longitudinal direction of guideways 46 are pairs of I-beam support members 63 and 64, which support members 63 and 64 have their respective end portions slidably contacting the guideways 46 and 46' (FIG. 5). All support members 63 are connected to a longitudinally extending angle iron or frame member 65 while all support members 64 are connected to an angle iron or frame member 66. Suitably mounted between certain adjacent support members 63 and 64 are hydraulic cylinders 67, which hydraulic cylinders 67 have their cylinder ends connected as by brackets 68 to frame member 66 while having their respective piston rods 69 connected via brackets 70 to frame member 65. Upon simultaneous pressurization of the respective rod end of hydraulic cylinders 67, the respective frame members 65 and 66 are moved away from each other whereas simultaneous pressurization of the head end of hydraulic cylinders 67 moves the frame members 65 and 66 toward each other. Movement of frame members 65 and 66 away from each other reciprocate the respective support members 63 and 64 relative to each other for a purpose to be described. Suitable guide means are provided between the channel members 45 and 45' to maintain the frame members 65 and 66 in parallel relationship to facilitate the movements thereof. Suitably mounted on the transversely extending support members 63 for movement therewith is a plurality of spaced longitudinally extending curing frames 71, rectangular in cross section (as shown in FIG. 3). Mounted on the transversely extending support members 64 for movement therewith is a pair of spaced longitudinally extending curing frames 72. The respective curing frames 72 cooperate with the curing frames 71 adjacent thereto to define cavities therebetween which are alternately narrow and wide (see FIGS. 1 and 3). Although only five curing frames have been shown, it is to be understood that a greater or less number of curing frames may be used whereby a greater or less number of hoses may be cured simultaneously.

Figure 10:
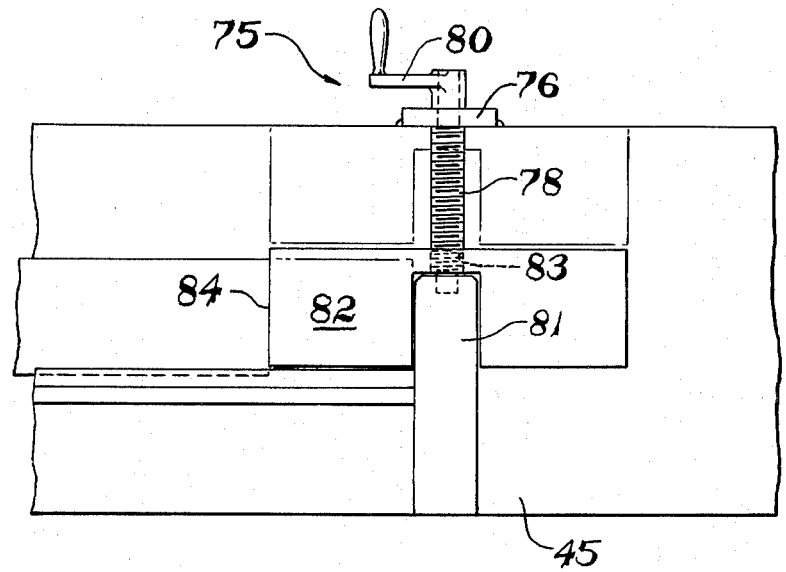
FIG. 10 is a side elevational view of an adjustable stop member showing the stop member in a second adjusted position in phantom lines.
Figure 4:
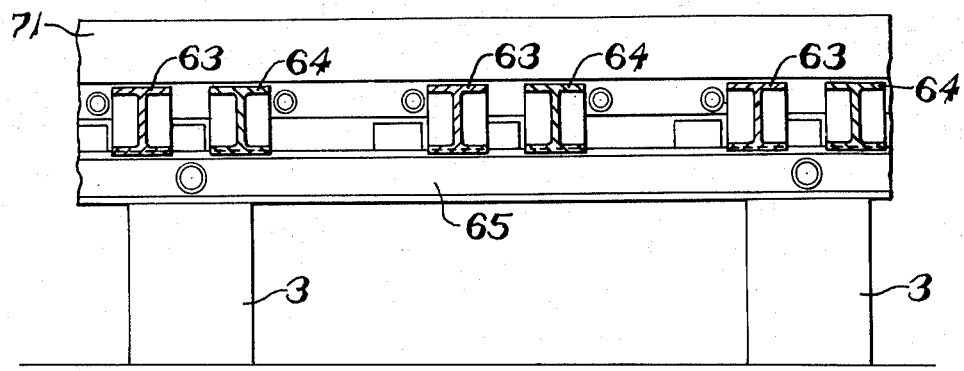
FIG. 4 is a partial fragmentary cross-sectional view of the curing table.

Adjacent the one end of table 2, an adjustable stop member 75 is mounted on each channel member 45 and 45'. Stop member 75 comprises an upper bracket 76 on which is journalled for rotation a downwardly depending threaded shaft 78. The one end of shaft 78 receives a crank arm 80, and the other end is journalled for rotation in a guide block 81, which block 81 is suitably secured to the channel member 45. A stop member 82 suitably guided on table 2 has a central threaded bore 83 received by shaft 78 for movement upwardly and downwardly relative thereto by rotation of shaft 78. Stop member 82 in the position shown in full lines in FIG. 10 provides an abutting surface 84 which limits the endwise movement of wedge bar 49 and cam member 60 thereon. With the stop member 82 in the raised position as shown by phantom lines in FIG. 10, the endwise movement of wedge bar 49 is only limited by the guide block 81.

Preliminary to the curing of hose, hydraulic cylinders 43' are pressurized to extend their respective chucks 9' rightwardly as viewed in FIG. 2b substantially to the position shown whereby a length of hose may be inserted in such chucks 9'.

A pair of hoses designated 1' are placed in the wide spaces or cavities between the curing frames 71 and 72. Pressurization of the rod end of air cylinder 23 associated with chucks 9' retracts piston rod 24 and simultaneously therewith moves links 26 leftwardly (as viewed in FIG. 8) therewith along with jaw blocks 27. Guideways 28 direct the outward and backward movement of jaw blocks 27 in cooperation with the guide members 30 whereby the serrated arcuate recesses 36 on the jaw block 27 move away from the respective side portions of serrated projection 32 substantially to the position shown in FIG. 8. One end of hose 1' is then inserted over projection 32. Pressurization of the head end of air cylinder 23 via control valve 10 directs pressurized fluid from a pressure source via conduit 8 to such head end and operates to move the piston rod 24 rightwardly as viewed in FIG. 8 to thereby move the respective jaw block 27 and guide members 30 inwardly toward each other via the converging guideways 28. Such rightward movement of jaw blocks 27 moves the respective serrated recesses 36 into clamping engagement with the end portion of hose 1' in cooperation with the serrated projection 32. The other end portion of the hose 1' is inserted into chuck 13 and clamped thereto in the same manner as described above in the clamping action of chuck 9. With the respective ends of hose 1' securely held by chucks 9' and the associated chucks 13, valve 16 is operated to initially provide air via supply line 17 to round out the hose 1'. The rod end of hydraulic cylinders 43' are pressurized to thereby exert a force in the leftward direction as viewed in FIGS. 2a and 2b, moving chucks 9' leftward to stretch the hoses 1' such that the hoses 1' are in the cavities formed between curing frames 71 and 72. Valve 16 is then connected to a steam supply source to admit steam via chuck 13 to the one end of hose 1' to completely fill the hose 1'. The hose lengths are held under substantially constant tension by means of the hyraulic pressure cylinders 43' during vulcanization, which is effected by circulating a heating fluid, such as steam, through the hose 1'. Condensate formed in the hose 1' is drained via opening 35, bore 33, and conduits 34 and 11. The hoses 1' are cured round for one-half of the cure cycle and then the steam to conduits 17 of chucks 13 are cut off and blow down effected.

The wedge bars 49 and 49' and their associated cam members 60 and 60' are moved to their neutral position by the energization of solenoid B. Pressurized fluid from a pump P (FIG. 11) flows via conduit 77 through valve 85, thence via conduit 86 to pressurize chamber 87, a rod end of hydraulic cylinders 47 while simultaneously pressurizing chamber 88, the head end of one of the hydraulic cylinders 47. Such action operates to retract wedge bar 49 for one half of its extended stroke and extends wedge bar 49' for one half of its potential extended position. As viewed in FIG. 2b, such action clears the cam members 60 and 60' from possible abutting engagement of support members 63 and 64 such that support members 63 and 64 are free for unrestricted movement between bumper bars 50 and 50'.

With such wedge bars 49 and 49' in neutral position, solenoid E is energized whereby pressurized fluid from pump P flows via valve 74, conduit 89 to conduit 90 to pressurized chamber 92 to thereby move frame members 65 and 66 toward each other as viewed in FIG. 11 to the position shown in FIG. 5. Such action terminates upon the abutting engagement of the end portion of support members 63 and 64 with the bumper bars 50 and 50' respectively. As viewed in FIG. 5, end portion 94 of support member 64 abuttingly engages bumper bar 50' while the end portion 95 of support member 63 abuttingly engages bumper bar 50. Thereafter solenoid C is energized to direct pressurized fluid from pump P via pressurized conduits 77 and 96, valve 97 to pressurize conduit 98 and chambers 99 and 100 whereby wedge bar 49 is fully retracted and wedge bar 49' is fully extended to where the remote end portion thereof engages abutting surface 84 of the adjustable stop member 75 mounted on channel member 45'. Such action positions the cam mmebers 60 and 60' into the positions shown in FIG. 5. Solenoid E is then de-energized to return valve 74 to its neutral position. Such action defines cavities of large width between curing frames 71 and 72 where formerly such cavities were relatively narrow and defines cavities of narrow width between curing frames 71 and 72 where formerly such cavities were relatively wide. Thus the hoses 1' which were located in cavities of large width are thereby compressed into cavities of relatively narrow width to impart an oblong cross section to hose 1'.

The chucks 9 are thence moved rightwardly (as viewed in FIGS. 2a and 2b) into loading position by pressurizing the head end of hydraulic cylinders 43. Hoses 1 are placed in the wide cavities as defined above between the curing heads 71 and 72. The respective end portions of the hoses 1 are then clamped in the chucks 9 and 13 in the same manner as discussed above. The rod end of hydraulic cylinders 43 are then pressurized to exert a force in the leftward direction as viewed in FIGS. 2a and 2b, moving chucks 9 leftward to stretch the hoses 1 such that the hoses 1 are located within the wide cavities formed between curing frames 71 and 72. Valve 16 is then connected to a steam supply source to admit steam via chucks 13 to hoses 1 and 1'. The condensate formed in the hoses 1 and 1' are drained via openings 35 in projections 32. The previously round cured hoses 1' are presently cured in a flat or oblong cross-sectional condition as a final cure whereas the hoses 1 are cured in a round condition, preparatory to the flat curing process. After vulcanization of the hoses 1 and 1', the flat cured hoses 1' are uncoupled at their respective ends after steam is cut off and the tension from hydraulic cylinders 43' released and the hoses 1' are removed from the apparatus. It will be noted that since the respective hydraulic cylinders 43 and 43' are subjected to the same pressure and each is individually coupled only to one hose, each hose is stretched to its full maximum length, obtaining a prestretched hose.

Provision is made for adjusting and varying the width of a curing form to accommodate either single or double-jacketed hose. In a double-jacketed hose, filler cords are run in opposite direction to eliminate twist in the finished hose and accordingly the accommodation of a hose curing apparatus that permits such flexibility in size provides greater economy.

In order to accommodate double-jacketed hose, stop member 82 is adjusted to move abutting surface 84 upwardly to clear the wedge bars 49 and 49' into the phantom position shown in FIG. 10. Such action permits the movement of wedge bars 49 and 49' with their respective cam members 60 and 60' such that cam profiles 61 and 61' operate to limit the transverse movement of support members 63 and 64 rather than cam profile 62 and 62'. Such action provides cavities of greater width to thereby accommodate double-jacketed hose.

Various modifications are contemplated and may obviously be resorted to by those skilled in the art without departing from the spirit and scope of the invention, as hereinafter defined by the appended claims, as only a preferred embodiment thereof has been disclosed.

We claim:

1. Apparatus for vulcanizing hose comprising chuck means for holding the hose under longitudinal tension, spaced holding means adapted to restrain opposite side portions of a hose to hold such hose in oblong cross-sectional form, means operatively connected to said spaced holding means for adjusting the distance between said spaced holding means to vary the cross-sectional form assumed by a hose positioned therebetween from a circular cross-sectional form to an oblong cross-sectional form, and means for passing a heating fluid through said chuck means for flow through the hose.

2. Apparatus for vulcanizing hose comprising a support, said support having at least a pair of movable members having side portions adapted to engage a hose and hold the hose in oblong cross-sectional form, holding means on said support for holding the hose under longitudinal tension between said movable members, means operatively connected to said members for adjusting the spacing between said side portions to selectively hold a hose in oblong cross-sectional form or permit such hose to assume a circular cross-sectional form, and means for circulating a heating fluid through the holding means and through the hose.

3. Apparatus for vulcanizing hose comprising a base having a pair of longitudinally extending support members, means operatively connected to said members for selectively moving said members transversely of their longitudinal direction in adjusted spaced parallel relationship relative to each other, a plurality of spaced holding means extending in the same longitudinally extending direction as said support members with alternate spaced holding means defining one set of holding means and the remaining alternate spaced holding means defining another set of holding means, said one set of holding means being connected to one of said support members for movement therewith and with the other set of alternate holding means being connected to the other of said support members whereby relative movement of said support members operates to vary the cavities between said spaced holding means to provide alternate cavities of large and small width, chuck means on said base for holding hose under longitudinal tension between said cavities, and means for circulating a heating fluid through said chuck means and through the hose.

4. Apparatus for vulcanizing hose as set forth in claim 3 wherein said base supports a plurality of cams movably mounted thereon and cooperative with said holding means to retain said holding means in adjusted position, and means for moving said cams.

5. An apparatus for processing a tubular hose having a fabric cover and a vulcanizable rubber lining comprising, a stationary header adapted to be connected to a vulcanizing fluid; means for connecting and securing one end of such hose to said header to connect such hose end to the vulcanizing fluid, means for applying a constant predetermined pull to the other end of such a hose to elongate such hose while the rubber lining is being vulcanized by the vulcanizing fluid admitted internally thereof, means for supporting opposite side portions of the tube for the full length thereof allowing unrestricted elongation of the tube over the entire length thereof, said opposite side portions being parallel and defining a cavity therebetween, and means operatively connected to said supporting means for adjusting the respective side portion to widen and narrow said cavity whereby a hose is adapted to be cured initially in the circular cross-sectional form followed by a final cure in the oblong cross-sectional form.

6. In an apparatus for curing tubular articles, a stationary head containing a vulcanizing fluid, means for connecting and securing one end of each article to said head so fluid may be admitted inside thereof, a bed having a plurality of movable decks with longitudinally extending curing frames defining slots between adjacent frames, a plurality of cylinders cooperating with said bed in alignment with said slots, chuck means operatively connected to each of said cylinders and in alignment with said slots whereby each chuck means is adapted to be detachably connected to the other end of each tubular article, and means operatively connected to said movable decks for adjusting the spacing of said curing frame and the width of said slots.

7. An apparatus for vulcanizing hose comprising a stationary support having a first hose clamping means mounted thereon, said hose clamping means having means for supplying vulcanizing fluid to a hose clamped thereto, a second hose clamping means mounted on a frame spaced from said support, means for applying a constant predetermined pull to said second hose clamping means to elongate a hose held between said first hose clamping means and said second hose clamping means, each of said first and second hose clamping means comprising a support member, said support member having an elongated serrated projection in alignment with the longitudinal center line extending between said hose clamping means, guide means on each of said support members wherein said guide means converge toward one end of said support member, work engaging means slidably mounted on each of said guide means for movement thereon, means mounted on said support operatively connected to said work engaging means for moving said work engaging means into cooperative clamping engagement with said serrated projection, means operatively connected to said projection and extending longitudinally therethrough for communication with the interior of a hose held by said second hose clamping means, a bed having a plurality of movable decks defining a cavity therebetween in alignment with said hose clamping means, and means operatively connected to said movable decks for adjusting the width of said cavity.

8. An apparatus for vulcanizing hose comprising a plurality of laterally spaced chuck means for holding hose under longitudinal tension, a plurality of laterally spaced longitudinally extending holding means operative to restrain opposite side portions of a hose held by said chuck means, means operatively connected to said spaced holding means for moving said spaced holding means laterally between selective positions to vary the distance between adjacent ones of said holding means to present a plurality of cavities therebetween of alternating different sizes.

References Cited by the Examiner

UNITED STATES PATENTS

| | | | |
|---|---|---|---|
| 553,877 | 2/1896 | Stowe | 18—6 |
| 1,225,981 | 5/1917 | Loughridge | 269—152 |
| 1,939,871 | 12/1933 | Bedur | 18—6 |
| 2,069,197 | 2/1937 | Curtiss | 18—6 |
| 2,238,831 | 4/1941 | Steach | 269—152 |
| 2,434,219 | 1/1948 | Morrison | 285—322 |
| 2,458,833 | 1/1949 | Carigan | 285—322 |

WILLIAM J. STEPHENSON, *Primary Examiner.*